(12) United States Patent
Bennett

(10) Patent No.: US 8,838,803 B2
(45) Date of Patent: Sep. 16, 2014

(54) METHODS AND APPARATUS FOR MANAGEMENT OF USER PRESENCE IN COMMUNICATION ACTIVITIES

(75) Inventor: Richard Bennett, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1478 days.

(21) Appl. No.: 11/960,862

(22) Filed: Dec. 20, 2007

(65) Prior Publication Data

US 2009/0165089 A1   Jun. 25, 2009

(51) Int. Cl.
*G06F 15/16* (2006.01)
*G06F 21/41* (2013.01)
*G06F 21/62* (2013.01)
*H04L 29/08* (2006.01)

(52) U.S. Cl.
CPC ............ *G06F 21/6218* (2013.01); *G06F 21/41* (2013.01); *H04L 67/306* (2013.01); *G06F 2221/2149* (2013.01); *Y10S 707/99931* (2013.01); *Y10S 707/99933* (2013.01); *Y10S 707/99935* (2013.01); *Y10S 707/99939* (2013.01); *Y10S 707/9994* (2013.01); *Y10S 707/99943* (2013.01); *Y10S 707/99948* (2013.01)
USPC ........... 709/227; 709/203; 709/217; 709/220; 709/223; 709/224; 709/225; 709/226; 709/228; 709/229; 706/14; 706/45; 706/46; 707/999.001; 707/705; 707/732; 707/733; 707/734; 707/999.003; 707/999.005; 707/999.009; 707/999.01; 707/999.102; 707/999.107; 705/50; 705/37; 705/38; 705/39; 705/40; 705/51; 705/52; 705/53; 705/54; 705/55; 705/56; 705/57; 705/58; 705/59; 705/60; 705/64; 705/67; 705/69; 705/75; 726/3; 726/4; 726/5; 726/6; 726/7; 726/8; 726/9; 726/10; 726/16; 726/17; 726/18; 726/19; 726/20; 726/21; 726/27; 726/28; 726/29; 726/30

(58) Field of Classification Search
CPC .................... G06F 21/30–21/40; G06F 21/41; G06F 21/42–21/44; G06F 21/60–21/606; G06F 21/62–21/6218; G06F 21/629; G06F 21/64–21/645; G06F 2221/2149; H04L 2209/56; H04L 67/30–67/306
USPC ......... 709/203, 217, 220, 223, 224, 225, 226, 709/227, 228, 229; 706/14, 45, 46; 707/104.1, 3, 5, 9, 10, 102, 705, 732, 707/733, 734, 999.003, 999.005, 999.009, 707/999.01, 999.102, 999.107; 705/26, 705/37–38, 39, 40, 50–69, 75; 726/3–10, 726/16–21, 27–30
See application file for complete search history.

(56) References Cited

U.S. PATENT DOCUMENTS 5,515,098 A * 5/1996 Carles ............................. 725/35
6,105,066 A * 8/2000 Hayes, Jr. ..................... 709/226

(Continued)

*Primary Examiner* — Saket K Daftuar

(57) ABSTRACT

Systems and techniques for mediating user communications. A user persona manager maintains one or more user profiles and manages user interactions with other parties and with service providers based on user preferences associated with the user profile or profiles selected for a particular interaction. The persona manager receives a single set of user authentication information to establish the user identity, and provides previously stored information to other parties and service providers as appropriate, and otherwise conducts user interactions involving communications initiated by or on behalf of the user. The persona manager also examines interactions initiated by others, selects user profiles appropriate to the interactions, and routes and responds to the interactions based on information stored in the user profiles.

10 Claims, 2 Drawing Sheets

(56) References Cited

U.S. PATENT DOCUMENTS

| | | | |
|---|---|---|---|
| 6,134,548 A * | 10/2000 | Gottsman et al. | 705/26.9 |
| 6,205,472 B1 * | 3/2001 | Gilmour | 709/206 |
| 6,640,229 B1 * | 10/2003 | Gilmour et al. | 707/784 |
| 6,956,845 B2 * | 10/2005 | Baker et al. | 370/352 |
| 6,970,879 B1 * | 11/2005 | Gilmour | 340/691.6 |
| 7,076,504 B1 * | 7/2006 | Handel et al. | 705/14.39 |
| 7,287,270 B2 * | 10/2007 | Kai | 726/2 |
| 7,383,570 B2 * | 6/2008 | Pinkas et al. | 726/2 |
| 7,483,438 B2 * | 1/2009 | Serghi et al. | 370/401 |
| 7,523,191 B1 * | 4/2009 | Thomas et al. | 709/224 |
| 7,630,986 B1 * | 12/2009 | Herz et al. | 1/1 |
| 7,673,327 B1 * | 3/2010 | Polis et al. | 726/5 |
| RE41,899 E * | 10/2010 | Rose et al. | 706/46 |
| 7,827,170 B1 * | 11/2010 | Horling et al. | 707/722 |
| 7,840,808 B2 * | 11/2010 | Takamizawa et al. | 713/170 |
| 7,840,813 B2 * | 11/2010 | Canard et al. | 713/176 |
| 7,853,535 B2 * | 12/2010 | Colella | 705/67 |
| 7,861,077 B1 * | 12/2010 | Gallagher, III | 713/155 |
| 7,945,475 B2 * | 5/2011 | Jacobi et al. | 705/14.53 |
| 7,949,609 B2 * | 5/2011 | Colella | 705/64 |
| 8,151,364 B2 * | 4/2012 | Hewitt et al. | 726/30 |
| 8,538,011 B2 * | 9/2013 | Moskowitz | 380/28 |
| 2002/0029185 A1 * | 3/2002 | Tanaka et al. | 705/37 |
| 2002/0056004 A1 * | 5/2002 | Smith et al. | 709/227 |
| 2002/0087892 A1 * | 7/2002 | Imazu | 713/202 |
| 2002/0116231 A1 * | 8/2002 | Hele et al. | 705/4 |
| 2003/0177187 A1 * | 9/2003 | Levine et al. | 709/205 |
| 2003/0208684 A1 * | 11/2003 | Camacho et al. | 713/186 |
| 2004/0030935 A1 * | 2/2004 | Kai | 713/202 |
| 2005/0038715 A1 * | 2/2005 | Sines et al. | 705/26 |
| 2005/0192893 A1 * | 9/2005 | Keeling et al. | 705/39 |
| 2005/0273420 A1 * | 12/2005 | Subramanian | 705/37 |
| 2006/0015624 A1 * | 1/2006 | Smith et al. | 709/227 |
| 2006/0020559 A1 * | 1/2006 | Steinmetz | 705/67 |
| 2006/0143122 A1 * | 6/2006 | Sines et al. | 705/40 |
| 2006/0184428 A1 * | 8/2006 | Sines et al. | 705/26 |
| 2006/0195382 A1 * | 8/2006 | Sung | 705/37 |
| 2006/0195441 A1 * | 8/2006 | Julia et al. | 707/5 |
| 2006/0235973 A1 * | 10/2006 | McBride et al. | 709/226 |
| 2006/0242291 A1 * | 10/2006 | Nevalainen | 709/224 |
| 2006/0268835 A1 * | 11/2006 | Hyotylainen et al. | 370/352 |
| 2007/0053518 A1 * | 3/2007 | Tompkins et al. | 380/270 |
| 2007/0054739 A1 * | 3/2007 | Amaitis et al. | 463/42 |
| 2007/0136179 A1 * | 6/2007 | Nguyen | 705/37 |
| 2007/0173323 A1 * | 7/2007 | Johnson et al. | 463/42 |
| 2007/0174206 A1 * | 7/2007 | Colella | 705/64 |
| 2007/0197296 A1 * | 8/2007 | Lee | 463/42 |
| 2007/0220007 A1 * | 9/2007 | Narita et al. | 707/9 |
| 2007/0234421 A1 * | 10/2007 | Ogino et al. | 726/19 |
| 2007/0243922 A1 * | 10/2007 | Coupland | 463/16 |
| 2007/0300292 A1 * | 12/2007 | Scipioni et al. | 726/5 |
| 2008/0010141 A1 * | 1/2008 | Smith et al. | 705/14 |
| 2008/0065486 A1 * | 3/2008 | Vincent et al. | 705/14 |
| 2008/0097822 A1 * | 4/2008 | Schigel et al. | 705/10 |
| 2008/0184346 A1 * | 7/2008 | Pinkas et al. | 726/5 |
| 2008/0189212 A1 * | 8/2008 | Kulakowski et al. | 705/50 |
| 2008/0268947 A1 * | 10/2008 | Fyock et al. | 463/29 |
| 2008/0287182 A1 * | 11/2008 | Aida | 463/25 |
| 2009/0006262 A1 * | 1/2009 | Brown et al. | 705/64 |
| 2009/0178127 A1 * | 7/2009 | Ogino et al. | 726/7 |
| 2010/0023412 A1 * | 1/2010 | Kitagawa et al. | 705/26 |

* cited by examiner

METHODS AND APPARATUS FOR MANAGEMENT OF USER PRESENCE IN COMMUNICATION ACTIVITIES

FIELD OF THE INVENTION

The present invention relates generally to improvements to communications and user interfaces with communication systems. More particularly, the invention relates to improved systems and techniques for managing the presence presented by a user in different communication contexts.

BACKGROUND OF THE INVENTION

Communication is of great and increasing importance in modern life. Many people spend much of their lives in communication with others in numerous different contexts, such as personal and work email, instant messaging, voice communication, text messaging, online shopping, online auctions, and innumerable other different varieties of communication. Users present many different personas in these contexts, for example, presenting different patterns of behavior and sharing different types of information. In their activities in different personas, users may employ the same or some of the same communication methods, such as instant messaging, email, or other methods, with the user presenting his or her persona based on the identities of the persons and groups with whom he or she is interacting and the activities being conducted, rather than the mechanics by which communication is conducted.

Many users engage in myriad different types of activities, with each type of activity being associated with numerous elements of information relating to the user. For example, a member of a professional organization may have identifiers, such as a registration number identifying himself or herself as a member of the organization, and a user id and password used to log in to a website maintained by the organization. The user may also be willing to share information with members of the organization that he or she may not be willing to share with other persons, such as unidentified email correspondents.

In addition, many people employ numerous different elements of information to identify themselves in their various activities, maintaining, for example, numerous different sets of user ids and passwords. In addition, persons may engage in sets of activities associated with a particular persona, such as actions taken by a player's character in an online game, or bidding habits in online auctions. As the number of activities in which users are engaged continues to increase, the burden of managing the information identifying and enabling these activities continues to increase.

SUMMARY OF THE INVENTION

Among its several aspects, the present invention addresses such issues, as well as others, by presenting a user with a mechanism for managing his or her different personas, and the various public presences that are presented by following the preferences in the different persona. The public presence of a user may include, for example, different identities that are presented in various public venues. For example, a user may wish to present his or her true identity in venues such as his or her work or financial activities, but may wish to present a pseudonymous activity in other venues, such as public forums. In addition, the public presence that a user wishes to present may influence the behavior that may be engaged in by the user. For example, one persona may include preferences directed toward cautious or aggressive tendencies in venues such as online auctions, so that a persona can present a public presence of a user that automatically behaves in certain ways based on the preferences expressed in that persona. Still another aspect of the user's public presence can relate to sharing of information and what sort of information is shared, and with whom.

A user presents a single authenticator to a persona manager, which mediates between the user and the various mechanisms he or she uses to engage in his or her various online activities. The persona manager suitably stores identifiers, permissions, behavior preferences, and other selections established by the user. The user is able to use the persona manager to invoke various activities, and the persona manager automates various aspects of the activities, implementing user actions and providing authorized information according to the particular activity being engaged in and the particular persona being presented.

The persona manager can also manage incoming communications, for example, managing responses to requests for instant messaging sessions, emails, requests for information, and other incoming communications. The persona manager can examine an incoming communication, identifying the source of the communication and associating the communication with a particular persona presented by the user, and deal with the communication appropriately. A communication from an unknown sender may be given a low priority, and a communication from a specifically rejected user may be blocked. A communication from a colleague may be given a high priority, or may be treated in specified ways, such as routing it to a user's work email address, or alerting the user through an instant message or voicemail. Numerous additional mechanisms for managing incoming communications may be employed, as specified by the user or determined by rules set up by the user.

A more complete understanding of the present invention, as well as further features and advantages of the invention, will be apparent from the following Detailed Description and the accompanying drawings.

DETAILED DESCRIPTION

Figure 1:
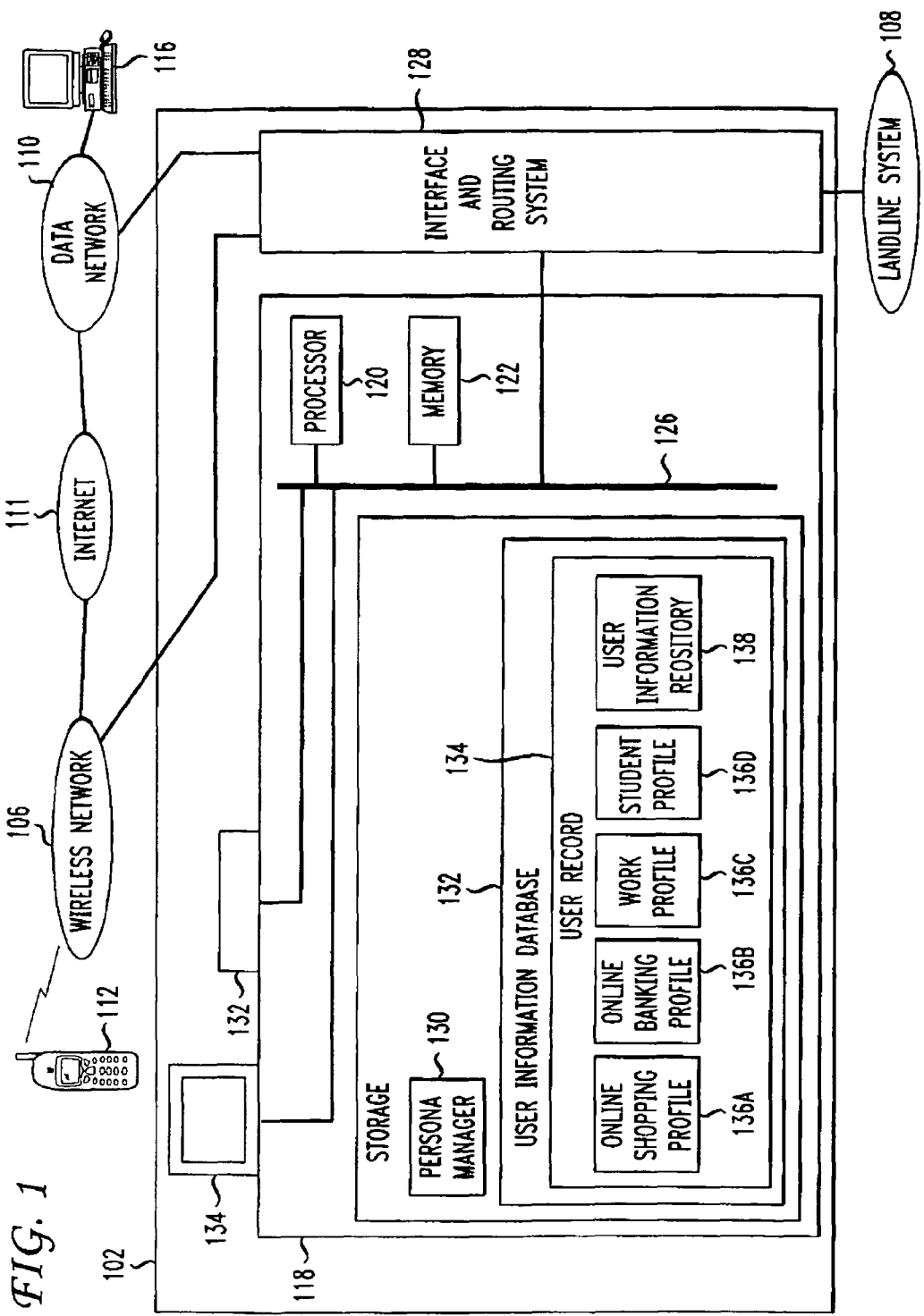
FIG. 1 illustrates a communication system according to an aspect of the present invention.

FIG. 1 illustrates a communication system 100 according to an aspect of the present invention. The system 100 includes a central exchange 102, coordinating the activities of a wireless telephone network 106, a landline telephone system 108, and a wireless data network 110. The wireless data network 110 and the wireless telephone network 106 are illustrated separately here, but it will be recognized that a wireless telephone network may provide comprehensive data capabilities. It will be recognized that numerous networks may provide access to the public Internet 111 with the wireless telephone network 106 and the wireless data network 110 illustrated here as providing such access.

The central exchange 102 directs communication traffic to customers. Traffic may originate in any of the various networks and systems 106, 108, and 110, but a communication may be redirected to a different network from that in which the communication originated. For example, a text message directed to a user's email may be redirected to the user's cellular telephone, or a telephone message may be redirected to a user's instant messaging client.

A user communicates with the system 100 using a number of devices, including a cellular telephone 112, a landline telephone 114, and a computer 116. The cellular telephone 112 suitably provides data capabilities and is capable of communicating over the cellular telephone network 106 and the wireless data network 110. The user is able to employ each of these devices to interact with numerous different persons and organizations in numerous different ways.

The central exchange 102 suitably includes a server 118, including a processor 120, memory 122, and storage 124, communicating over a bus 126. The exchange 102 also includes an interface and routing system 128, for receiving and routing communications received over the various networks 106, 108, and 110. The interface and routing system delivers information relating to various communications to the server 118, which then supplies information used in directing, forwarding, responding to, or otherwise managing the communications.

The server 118 implements a persona manager 130, which may suitably be implemented as software hosted in storage 124 and transferred to memory 122 for execution as needed by the processor 120. The persona manager 130 has access to a user information database 132, hosting a plurality of user records that may suitably include user preferences, rules, and information, for each user of the system. For simplicity, the operation of the persona manager 130 will be described with respect to a single user, but it will be recognized that the persona manager will typically provide services to a large number of users and managing a large number of communications.

The persona manager 130 presents an interface to the user, allowing the user to present a single set of authenticators that will establish a first relationship between the persona manager 130 and the user, authorizing the persona manager to authenticate the user to all the different services that the user employs through the persona manager. Authentication may be accomplished, for example, by submitting a username and password using the computer 116 or the telephone 112, or may simply be accomplished through authentication information provided by the devices, such as an electronic serial number supplied by the cellular telephone, or an authentication key submitted by the computer 116. If desired, the persona manager 130 may be configured so as to require the user to submit additional authentication information for various classes of activities, such as a banking authenticator allowing access to the various banking activities conducted by the user, such as credit card, deposit account, and brokerage services. Once a user has provided the required authentication to the persona manager 130, the persona manager 130 can automatically supply authentication information to the various services to which the user may request access. This information might include the banking information mentioned above, entertainment subscription information, online shopping information, and whatever additional information is needed to obtain access to the services. The persona manager 130 is suitably able to sense the "presence" of a user. One example of such sensing might be recognizing the fact that a user's cellular 112 telephone is turned on, or that the user is engaged in a conversation using the cellular telephone. Another example might be the fact that the user's instant message client is active and the user is logged on, as well as whether the user is accessing the client from his or her computer or from a mobile device. Still another example might be the presence of a user's Bluetooth device in proximity to a particular Bluetooth server, with this information indicating the user's physical location.

In addition, the persona manager 130 may suitably examine the user's activities and communications on the public Internet, for example, shopping activities. All of this information can be used to detect the user's various private presences and to manage his or her public presences appropriately.

Suitably, the persona manager 130 has access to a number of user profiles, suitably stored in a user record 134 in the database 132. The profiles may include, for example, an online shopping and auction profile 136A, an online banking profile 136B, a work profile 136C, a student profile 136D, or any other profile that the user may wish to create, or that may be automatically established for the user. A user may specifically select a profile to be used. For example, before beginning a particular activity, such as an instant message session, the user may specify that the profile to be used is the student profile 136D. Alternatively, the persona manager 130 may suitably select the profile according to rules, taking into account information such as time of day, such as during the workday or on the weekend, location from which the user is initiating a communication, such as home, work, or school, service being invoked, such as banking services, online auction, professional association website, or person with whom communication is being initiated, such as a work colleague, a fellow student, a fellow member of a professional association, an unknown person, or a person whom the user specifically desires to avoid.

The user record 134 suitably includes a user information repository 138. The user information repository 138 suitably includes various elements of information that the user may desire to employ or to share, such as usernames and passwords for online services. The information repository 138 also includes information that may be shared with others, such as contact information that the user employs in various capacities. These may include work or student emails and telephone numbers, credit card billing addresses such as may be used in online shopping, frequent flyer numbers, and other information. The persona manager 130 controls the sharing of various aspects of these elements of information depending on user specifications and preferences.

The user may suitably supply information for storage in the information repository 138 on an ongoing basis, and information may suitably be extracted from user inputs during user activities for storage. For example, the persona manager 130 may monitor user communications, and may extract and store useful information entered by or supplied to the user during those communications. For example, when a user signs up for an airline frequent flyer program, the frequent flyer number may be recognized by the persona manager 130 and stored.

The persona manager 130 may suitably be active at all times, both responding to communications involving the user, whether initiated by the user or by a party contacting the user, and monitoring other activities affecting the user's public presence. A user may present a public presence in numerous different ways, such as maintaining a Myspace page or posting a Youtube video, as well as posting on forums, such as public interest and professional forums. Each of these public presences may elicit responses that may be of interest to the user, and the persona manager 130 may monitor the various public presences of the user to determine if responses or other communications have been presented in response to the user's activities. The persona manager 130 may present automated responses in appropriate cases, and may present appropriate alerts to the user when appropriate response or other events occur that may be of interest to the user.

In the case of a user initiated communication, the user presents an authentication to the persona manager 130. The persona manager 130 may be invoked whenever the user initiates a communication session, and the persona manager 130 examines authentication information presented in the communication session. In addition, the user may specifically invoke the persona manager 130, for example, through the computer 116, in order to add information to the repository 138, to establish, modify or delete user profiles, to add or change user preferences, which may suitably be recorded in a user preferences file, or to take such other actions as may be desired. For example, the user may add new email addresses as contacts, or may indicate that he or she has joined an organization and that the members of that organization are to have access to designated contact information for the user. The user may also employ a wireless device such as the telephone 112 for such purposes. Various rules and procedures may also be learned from the user's activities, such as accepting or blocking email, accepting or rejecting incoming telephone calls, and initiating telephone calls and contacts.

When the persona manager 130 is invoked in the course of a communication with another party that has been initiated by the user, the persona manger 130 examines the circumstances and context of the communication and takes action as needed. Suitably, the persona manager 130 selects a user profile from the user record 134 and examines the profile to determine the user preferences that are to be applied to the communication session. For example, if the user has initiated an instant message session with a student, the persona manager 130 may invoke an instant message service employing the instant messaging username that the user employs in communication with other students. Similarly, if a user is on a business trip, the persona manager 130 may invoke the user's work profile and may, for example, employ the user's work email address as the originating address for emails during the day and his or her home email address as the originating address during the evening and on weekends. The persona manager 130 may also supply information appropriate to a communication activity and the user profile appropriate to the activity. For example, the persona manage 130 may employ the banking profile 136B, and supply username and password information to an online banking site or may employ the shopping and auction profile 136E and use the preferences specified therein to automatically control user activities for online shopping, such as surveying auctions in which the user is participating and conducting bidding activity according to user preferences.

The persona manager 130 also manages incoming contacts with the user, examining the context of the contact and selecting the appropriate user profile and handling the contact according to the preferences specified in the profile. For example, an incoming instant messaging invitation will be examined to determine if the originator is known. An appropriate profile may be selected in view of the identity of the originator and in light of other circumstances surrounding the invitation. For example, if the user is at his or her work location, invitations from social friends may be rejected during work hours, with an appropriate message being returned to the originators. Telephone, email, and other contacts may be similarly managed. The persona manager 130 may also respond to information requests without necessarily requiring intervention by the user, For example, a fellow member of a common interest organization, such as antique collectors, may solicit an indication of interest in various items that the member has for sale. The persona manager 130 suitably identifies the originator of the message, invokes the online shopping and auction profile 136E, and generates a positive response with a request for additional information. The persona manager 130 also suitably passes the original message to an appropriate destination for the user, such as an email address, but does not need to wait for the user to notice and respond to the query in order to generate a request for information that may be of interest to the user. Other contacts, such as online advertisements, may be suppressed, allowed, or automatically responded to based on the identity of the sender and other information, such as the nature and content of the contact, as well as the context in which they are received, with the response being based on preferences expressed in the appropriate user profile.

Figure 2:
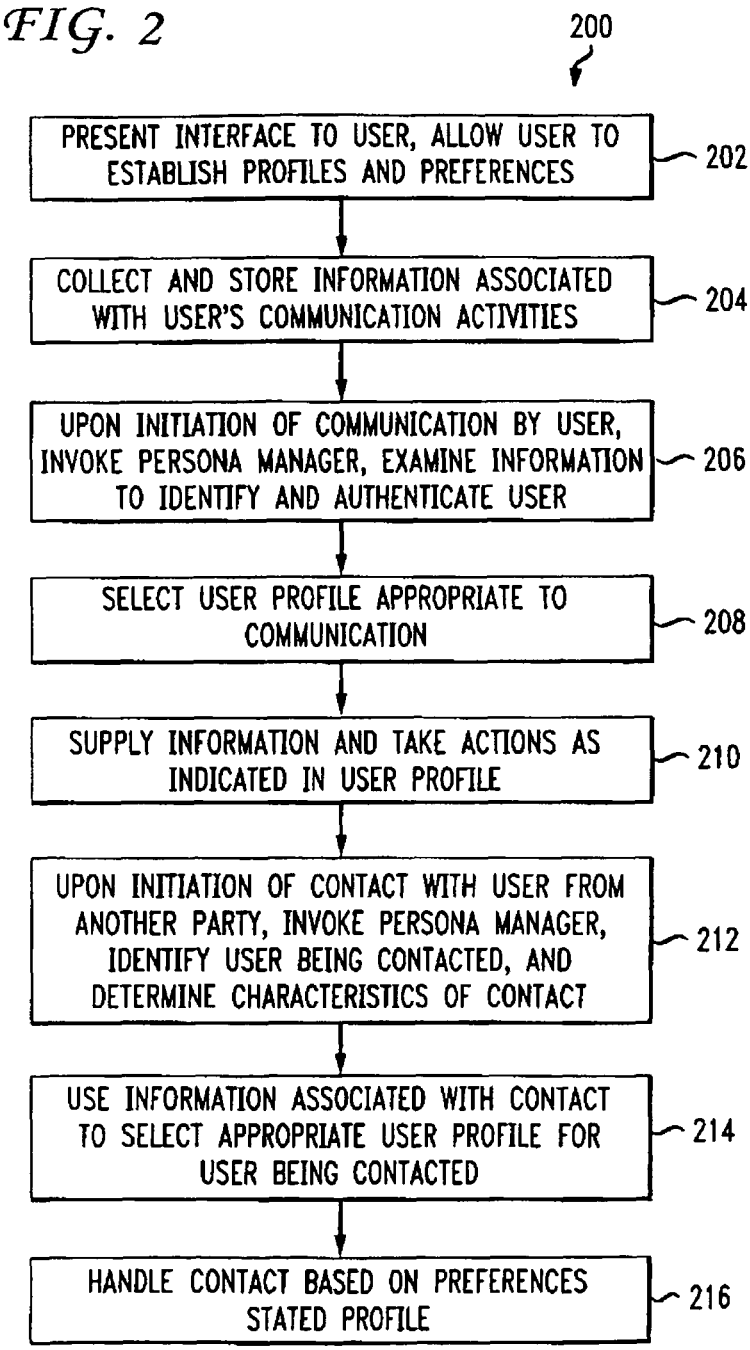
FIG. 2 illustrates a process of communication management according to an aspect of the present invention.

FIG. 2 illustrates the steps of a method 200 of communication according to an aspect of the present invention. At step 202, instructions are received from a user and employed to establish a set of profiles and preferences for managing communication activities. The set of profiles and preferences may include default profiles that can be modified as desired by the user, and may include profiles newly created by the user.

At step 204, user information associated with the user's communication activities is collected and stored, such as contact information, identification information for various services, such as usernames and passwords, and additional information to be employed by or for the user or shared with others as appropriate. At step 206, upon initiation of a communication by a user, a persona manager is invoked and information identifying and authenticating the user is examined. At step 208, upon verification of user authentication information by the profile manager, an appropriate user profile is selected, for example, by specific selection by the user, or automatically through examination of the nature and context of the communication. At step 210, during the user's communication activities, information is supplied and actions taken as appropriate to the user preferences specified in the selected user profile.

At step 212, upon initiation of a contact with a user from another party, the persona manager is invoked and the contact is examined to identify the user being contacted and to determine characteristics such as the identity of the originator, the nature and content of the contact, and the context in which the contact is being made. At step 214, the information surrounding the contact is used to identify an appropriate user profile to be associated with the contact. At step 216, the contact is handled according to user preferences associated with the user profile.

While the present invention is disclosed in the context of a presently preferred embodiment, it will be recognized that a wide variety of implementations may be employed by persons of ordinary skill in the art consistent with the above discussion and the claims which follow below.

I claim:

1. A communication system, comprising:
  a communication exchange including a non-transitory memory storing instructions that, when executed by a processor, cause the communication exchange to receive communications from a user directed to online service providers including a banking service provider and an on-line auction service provider and to receive communications to be directed to the user from the online service providers; and
  a persona manager including a non-transitory memory storing instructions that, when executed by a processor, cause the persona manager to monitor user interactions with online service providers to manage the user interactions according to predetermined user preferences stored as a plurality of user profiles associated with the user, including selecting a particular user profile from the plurality of user profiles based on an online service provider with which the user is interacting, and applying preferences from the particular user profile appropriate to the nature and context of the communications from the user;

wherein the instructions further cause the persona manager to monitor the user's public presence on an online service provider with which the user engages and to respond to interactions affecting the user according to user preferences in the particular user profile;

wherein the instructions further cause the persona manager to automatically supply user information appropriate to communications initiated by the user, the user information including banking authentication information for identifying the user in communications with the banking service provider, and further including on-line auction authentication information for identifying the user in communications with the on-line auction service provider;

wherein the instructions further cause the persona manager to release the user information to online service providers according to user preferences associated with user profiles selected for interactions involving the online service providers, the communications with the online service provider comprising communications with a person, the preferences including categories of information and categories of persons authorized to receive information in each of the categories of information, the user information including user identities using genuine user information or using pseudonymous user information depending on the category of the person to whom the information is to be released; and wherein the instructions further cause the persona manager to receive a communication originated by an originating on-line service provider, to determine, by examining the communication, an identity of the originating on-line service provider, to retrieve, after receiving the communication, one of the user profiles including rules for routing the communication based on the identity of the originating on-line service provider and on a content of the communication, to automatically select, according to the retrieved user profile, a routing destination from a plurality of user routing destinations including an instant messaging account, an email account and a telephone call, and to automatically route the communication to the routing destination selected from the plurality of user routing destinations according to the retrieved user profile, based on the identity of the originator and on the content of the communication.

2. The system of claim 1, wherein the persona manager receives a single set of user authentication information identifying the user and establishing a trust relationship between the persona manager and the user.

3. The system claim 1, wherein the persona manager authenticates the person as authorized to receive information based on inclusion in specified categories.

4. The system of claim 3, wherein authentication of a party as authorized to receive information includes receiving authentication information identifying the party with a particular organization.

5. The system of claim 1, wherein the persona manager selects the particular user profile based on conditions relating to the context in which the interaction occurs.

6. A method for managing a user presence in communication activities conducted via a data network, comprising:

by a processor, establishing a trust relationship with a user by receiving from the user via the data network a single set of user authentication information identifying the user;

by a processor, monitoring user interactions with online service providers including a banking service provider and an on-line auction service provider, to manage the user interactions according to predetermined user preferences stored in a user information database as a plurality of user profiles associated with the user, the profiles including banking authentication information and on-line auction authentication information;

by a processor, receiving from the user via the data network an initiation of a first communication with the banking service provider;

by a processor, automatically accessing the banking authentication information in the user information database;

by a processor, automatically transmitting via the data network the banking authentication information to the banking service provider for identifying the user in the first communication with the banking service provider;

by a processor, receiving from the user via the data network an initiation of a second communication with the on-line auction service provider;

by a processor, automatically accessing the on-line auction authentication information in the user information database;

by a processor, automatically transmitting via the data network the on-line auction authentication information to the on-line auction service provider for identifying the user in the second communication with the on-line auction service provider;

by a processor, receiving from the banking service provider via the data network a third communication originated by the banking service provider;

by a processor, determining an identity of an originator of the third communication by examining the third communication;

by a processor, after receiving the third communication, automatically retrieving from the user information database one of the plurality of user profiles including rules for routing the third communication based on the identity of the originator and on a content of the third communication;

by a processor, automatically selecting a routing destination from a plurality of user routing destinations including an instant messaging account, an email account and a telephone call, according to the rules from the user information database;

routing the third communication to the routing destination;

by a processor, monitoring the user's public presence on an online service provider with which the user engages and responding to interactions affecting the user according to user preferences in the user profile; and by a processor, releasing information to online service providers according to user preferences associated with user profiles selected for interactions involving the online service providers, the user interactions with the online service provider comprising communications with a person, the preferences including categories of information and categories of persons authorized to receive information in each of the categories of information, the user information including user identities using genuine user information or using pseudonymous user information depending on the category of the person to whom the information is to be released.

7. The method of claim 6, wherein the person is authorized to receive information based on inclusion in specified categories.

8. The method of claim 7, wherein authentication of a party as authorized to receive information includes receiving authentication information identifying the party with a particular organization.

9. The method of claim 6, further comprising:
selecting the particular user profile based on conditions relating to the context in which the interaction occurs.

10. The communication system of claim 1, wherein the instructions stored in the non-transitory memory of the persona manager additionally cause the persona manager to:
recognize as useful information a program identification number initially supplied to the user by an on-line service provider during the communications; and
storing the program identification number in one of the user profiles.

\* \* \* \* \*